United States Patent
Pillai

(10) Patent No.: US 11,004,260 B2
(45) Date of Patent: *May 11, 2021

(54) ITEM MODEL BASED ON DESCRIPTOR AND IMAGES

(71) Applicant: eBay Inc., San Jose, CA (US)

(72) Inventor: Sajeev Pillai, San Jose, CA (US)

(73) Assignee: eBay Inc., San Jose, CA (US)

(*) Notice: Subject to any disclaimer, the term of this patent is extended or adjusted under 35 U.S.C. 154(b) by 149 days.

This patent is subject to a terminal disclaimer.

(21) Appl. No.: 16/196,615

(22) Filed: Nov. 20, 2018

(65) Prior Publication Data

US 2019/0088010 A1 Mar. 21, 2019

Related U.S. Application Data

(63) Continuation of application No. 15/783,485, filed on Oct. 13, 2017, now Pat. No. 10,157,496, which is a continuation of application No. 13/907,256, filed on May 31, 2013, now Pat. No. 9,805,503, which is a continuation of application No. 13/082,110, filed on Apr. 7, 2011, now Pat. No. 8,473,362.

(51) Int. Cl.
*G06Q 30/00* (2012.01)
*G06T 17/00* (2006.01)
*G06Q 30/06* (2012.01)

(52) U.S. Cl.
CPC ......... *G06T 17/00* (2013.01); *G06Q 30/0621* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 5,255,352 A | 10/1993 | Falk | |
| 5,848,399 A | 12/1998 | Burke | |
| 5,903,270 A | 5/1999 | Gentry et al. | |
| 6,157,747 A | 12/2000 | Szeliski et al. | |

(Continued)

FOREIGN PATENT DOCUMENTS

| | | |
|---|---|---|
| AU | 2015249179 A1 | 11/2015 |
| CA | 2832227 C | 12/2016 |

(Continued)

OTHER PUBLICATIONS

Applicant Initiated Interview Summary received for U.S. Appl. No. 15/783,485, dated Mar. 30, 2018, 2 pages.

(Continued)

*Primary Examiner* — Mila Airapetian
(74) *Attorney, Agent, or Firm* — Faegre Drinker Biddle & Reath LLP

(57) ABSTRACT

A model generation machine may form all or part of a network-based system. The model generation machine may generate an item model (e.g., a 3D model of the item) based on a set of images of an item and based on a product model (e.g., a 3D model of a product of which the item is a specimen). The item may be available for purchase from a seller. The model generation machine may access the set of images, as well as a descriptor of the item. Based on the descriptor, the model generation machine may identify the product model. Accordingly, the model generation machine may generate the item model from the identified product model and the accessed set of images.

20 Claims, 11 Drawing Sheets

(56) References Cited

U.S. PATENT DOCUMENTS

| | | | |
|---|---|---|---|
| 6,278,460 | B1 | 8/2001 | Myers et al. |
| 6,549,200 | B1 | 4/2003 | Mortlock et al. |
| 6,677,944 | B1 | 1/2004 | Yamamoto |
| 6,744,441 | B2 | 6/2004 | Wu et al. |
| 6,999,073 | B1 | 2/2006 | Zwern et al. |
| 7,053,906 | B2 | 5/2006 | Kurihara |
| 7,184,047 | B1 | 2/2007 | Crampton |
| 7,246,085 | B2 | 7/2007 | Kamon et al. |
| 8,473,362 | B2 | 6/2013 | Pillai |
| 9,805,503 | B2 | 10/2017 | Pillai |
| 10,157,496 | B2 | 12/2018 | Pillai |
| 2001/0005425 | A1 | 6/2001 | Watanabe et al. |
| 2001/0056308 | A1 | 12/2001 | Petrov et al. |
| 2002/0072993 | A1 | 6/2002 | Sandus et al. |
| 2002/0133449 | A1 | 9/2002 | Segal et al. |
| 2006/0036577 | A1 | 2/2006 | Knighton et al. |
| 2006/0088205 | A1 | 4/2006 | Choi et al. |
| 2006/0119618 | A1 | 6/2006 | Knighton et al. |
| 2007/0291032 | A1 | 12/2007 | Hashima et al. |
| 2008/0126021 | A1 | 5/2008 | Hoguet |
| 2008/0211809 | A1 | 9/2008 | Kim et al. |
| 2008/0246757 | A1 | 10/2008 | Ito |
| 2009/0160856 | A1 | 6/2009 | Hoguet |
| 2009/0189899 | A1 | 7/2009 | Satoh |
| 2009/0303507 | A1 | 12/2009 | Abeloe |
| 2010/0284607 | A1 | 11/2010 | Van et al. |
| 2011/0218825 | A1 | 9/2011 | Hertenstein |
| 2011/0254840 | A1 | 10/2011 | Halstead |
| 2012/0163709 | A1 | 6/2012 | Barros et al. |
| 2012/0259738 | A1 | 10/2012 | Pillai |
| 2013/0257868 | A1 | 10/2013 | Pillai |
| 2018/0040157 | A1 | 2/2018 | Pillai |

FOREIGN PATENT DOCUMENTS

| | | |
|---|---|---|
| CN | 1732481 A | 2/2006 |
| CN | 101595510 A | 12/2009 |
| CN | 101686335 A | 3/2010 |
| CN | 102027504 A | 4/2011 |
| CN | 102236910 A | 11/2011 |
| CN | 103548051 A | 1/2014 |
| JP | 2009-541836 A | 11/2009 |
| KR | 10-2008-0083843 A | 9/2008 |
| KR | 10-2009-0004326 A | 1/2009 |
| KR | 10-2009-0048979 A | 5/2009 |
| KR | 10-2011-0117020 A | 10/2011 |
| KR | 10-1420041 B1 | 7/2014 |
| WO | 2002/039216 A2 | 5/2002 |
| WO | 2012/138452 A1 | 10/2012 |

OTHER PUBLICATIONS

Notice of Allowance received for U.S. Appl. No. 15/783,485, dated Aug. 6, 2018, 7 pages.
Applicant Initiated Interview Summary received for U.S. Appl. No. 15/783,485 dated Apr. 6, 2018, 2 pages.
Notice of Allowance received for U.S. Appl. No. 15/783,485 dated Apr. 17, 2018, 12 pages.
Preinterview First Office Action received for U.S. Appl. No. 15/783,485 dated Nov. 14, 2017, 4 pages.
Decision to Grant Received for Chinese Patent Application No. 201280022041.X dated Sep. 4, 2019, 6 pages (3 pages of English Translation and 3 pages of Official Copy).
"Photosynth—Capture your World in 3D", Retrieved from the Internet: <http://photosynth.net/>, May 2, 2012, 1 page.
"Photosynth—Create your own Photosynths", Retrieved from the Internet: <http://photosynth.net/create.aspx>, May 2, 2012, 1 page.
Office Action received for Korean Patent Application No. 10-2012-7032750, dated Dec. 24, 2013, 9 pages (3 pages of English Translation and 6 pages of Official Copy).
Response to Office Action filed on Feb. 20, 2014 for Korean Patent Application No. 10-2012-7032750, dated Dec. 24, 2013, 20 pages (5 pages of English Pending Claims and 15 pages of Official Copy).
Communication pursuant to Rules 94(3) EPC received for European Patent Application No. 12767928.0, dated Sep. 28, 2016, 6 pages.
Extended European Search Report received for European Patent Application No. 12767928.0, dated Jan. 13, 2015, 8 pages.
Response to Communication Pursuant to Article 94(3) EPC filed on Feb. 1, 2017 for European Patent Application No. 12767928.0, dated Sep. 28, 2016, 15 pages.
Response to Extended European Search Report filed on Aug. 3, 2015 for European Patent Application No. 12767928.0, dated Jan. 13, 2015, 16 pages.
Response to Office Action filed for European Application No. 12767928.0, dated Jan. 30, 2014, 20 pages.
Summons to attend oral proceedings for European Application No. 12767928.0, dated Jan. 17, 2018, 6 pages.
Non-Final Office Action received for U.S. Appl. No. 13/082,110, dated Aug. 20, 2012, 9 pages.
Non-Final Office Action received for U.S. Appl. No. 13/082,110, dated Nov. 29, 2012, 10 pages.
Notice of Allowance received for U.S. Appl. No. 13/082,110, dated Feb. 28, 2013, 9 pages.
Response to Non-Final Office Action filed on Feb. 13, 2013 for U.S. Appl. No. 13/082,110, dated Nov. 29, 2012, 11 pages.
Response to Non-Final Office Action filed on Nov. 16, 2012 for U.S. Appl. No. 13/082,110, dated Aug. 20, 2012, 12 pages.
Applicant Initiated Interview Summary received for U.S. Appl. No. 13/907,256, dated Aug. 24, 2015, 3 pages.
Final Office Action received for U.S. Appl. No. 13/907,256, dated Jun. 12, 2015, 8 pages.
Final Office Action received for U.S. Appl. No. 13/907,256, dated Nov. 17, 2016, 9 pages.
Non-Final Office Action received for U.S. Appl. No. 13/907,256, dated Apr. 22, 2016, 8 pages.
Non-Final Office Action received for U.S. Appl. No. 13/907,256, dated Dec. 10, 2014, 10 pages.
Notice of Allowance received for U.S. Appl. No. 13/907,256, dated Jun. 28, 2017, 10 pages.
Preliminary Amendment filed for U.S. Appl. No. 13/907,256, dated Aug. 2, 2013, 8 pages.
Response to Final Office Action filed on Apr. 27, 2017 for U.S. Appl. No. 13/907,256, dated Nov. 17, 2016, 19 pages.
Response to Final Office Action filed on Sep. 14, 2015 for U.S. Appl. No. 13/907,256, dated Jun. 12, 2015, 18 pages.
Response to Non-Final Office Action filed on Apr. 10, 2015 for U.S. Appl. No. 13/907,256, dated Dec. 10, 2014, 21 pages.
Response to Non-Final Office Action filed on Sep. 22, 2016, for U.S. Appl. No. 13/907,256, dated Apr. 22, 2016, 21 pages.
International Search Report received for PCT Application No. PCT/US2012/028785, dated Aug. 29, 2012, 3 pages.
Written Opinion received for PCT Application No. PCT/US2012/028785, dated Aug. 29, 2012, 5 pages.
Wikipedia, "Online Auction Tools", Retrieved from the Internet URL: <https://en.wikipedia.org/w/index.php?title=Online_auction_tools&o>, Nov. 19, 2010, 2 pages.
International Preliminary Report on Patentability received for PCT Application No. PCT/US2012/028785, dated Oct. 17, 2013, 5 pages.
Response to First Examiner Report filed on Sep. 23, 2016 for Australian Patent Application No. 2015249179, dated May 6, 2016, 16 pages.
Office Action received for Canadian Patent Application No. 2,832,227, dated Jan. 26, 2015, 4 pages.
Response to Office Action filed on Jul. 22, 2015 for Canadian Patent Application No. 2,832,227, dated Jan. 26, 2015, 15 pages.
Voluntary Amendment filed for Canadian Patent Application No. 2,832,227 dated Aug. 18, 2016, 8 pages.
First Examiner Report received for Australian Patent Application No. 2012240539, dated Jan. 29, 2015, 3 pages.
Response to First Examiner Report filed on Jul. 2, 2015 for Australian Patent Application No. 2012240539, dated Jan. 29, 2015, 23 pages.
Amendments filed for Chinese Application No. 201280022041.X, filed on Dec. 3, 2013, 50 pages.

(56) References Cited

OTHER PUBLICATIONS

Office Action received for Chinese Patent Application No. 201280022041.X, dated Aug. 25, 2016, 22 pages.
Office Action received for Chinese Patent Application No. 201280022041.X, dated Dec. 25, 2017, 24 pages.
Office Action received for Chinese Patent Application No. 201280022041.X, dated Dec. 29, 2015, 17 pages.
Office Action received for Chinese Patent Application No. 201280022041.X, dated Feb. 4, 2017, 22 pages.
Office Action received for Chinese Patent Application No. 201280022041.X, dated Jun. 13, 2017, 17 pages.
Response to Office Action filed on Apr. 9, 2018 for Chinese Patent Application No. 201280022041.X, dated Dec. 25, 2017, 8 pages.
Response to Office Action filed on Apr. 17, 2017 for Chinese Patent Application No. 201280022041.X, dated Feb. 4, 2017, 18 pages.
Response to Office Action filed on Aug. 28, 2017 for Chinese Patent Application No. 201280022041.X, dated Jun. 13, 2017, 19 pages.
Response to Office Action filed on May 9, 2016 for Chinese Patent Application No. 201280022041.X, dated Dec. 29, 2015, 17 pages.
Response to Office Action filed on Nov. 7, 2016 for Chinese Patent Application no. 201280022041.X, dated Aug. 25, 2016, 13 pages.
First Examiner Report received for Australian Patent Application No. 2015249179, dated May 6, 2016, 3 pages.

ITEM MODEL BASED ON DESCRIPTOR AND IMAGES

CLAIM OF PRIORITY

This application is a continuation of U.S. patent application Ser. No. 15/783,485, filed Oct. 13, 2017, now U.S. Pat. No. 10,157,496, and entitled "ITEM MODEL BASED ON DESCRIPTOR AND IMAGES," which is a continuation of U.S. patent application Ser. No. 13/907,256, filed May 31, 2013, now U.S. Pat. No. 9,805,503, and entitled "ITEM MODEL BASED ON DESCRIPTOR AND IMAGES," filed on May 31, 2013, which is a continuation of U.S. patent application Ser. No. 13/082,110, filed on Apr. 7, 2011, now U.S. Pat. No. 8,473,362, and entitled "ITEM MODEL BASED ON DESCRIPTOR AND IMAGES," the benefit of priority of each of which is claimed hereby. The contents of each of these prior applications are considered part of this application, and are each hereby incorporated by reference in their entirety.

TECHNICAL FIELD

The subject matter disclosed herein generally relates to the processing of data. Specifically, the present disclosure addresses systems and methods of generating an item model based on a descriptor and images.

BACKGROUND

A product may be manufactured by a manufacturer and available for purchase from a seller. For example, the product may take the form of a good, such as a physical item that has a three-dimensional (3D) shape. For example, a product may be a particular model of digital camera or a specific model of a car. The seller may be the same as the manufacturer, or the seller may be distinct from the manufacturer. An item may be a specimen (e.g., an individual instance) of the product, and multiple items may constitute multiple specimens of the product. Accordingly, a seller may seek to merchandise one or more items as specimens of the product.

In merchandising an item, the seller may use a network-based system to present information referencing the item to a user of the network-based system (e.g., a potential buyer of the item). Examples of network-based systems include commerce systems (e.g., shopping websites), publication systems (e.g., classified advertisement websites), listing systems (e.g., auction websites), and transaction systems (e.g., payment websites). Examples of information referencing the item include a product information document, a product review, a comment concerning the item, a view item page, a search result, an advertisement, a recommendation, a suggestion, an auction listing, a wish list, or any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
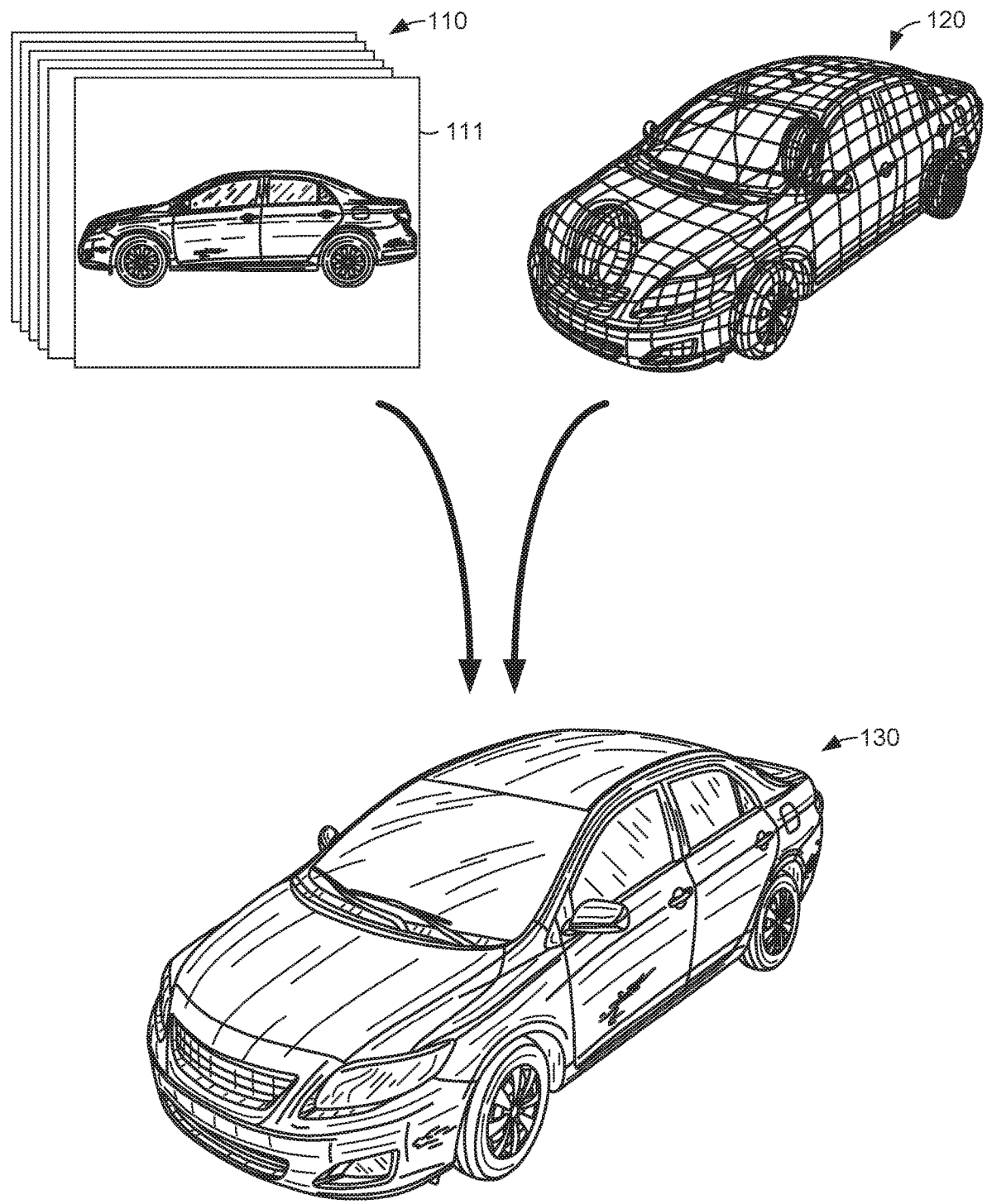
FIG. 1 is a conceptual diagram illustrating generation of an item model based on images of the item and on a product model, according to some example embodiments.

Example methods and systems are directed to generating an item model based on a descriptor and images. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A model generation machine may form all or part of a network-based system. The model generation machine may generate an item model (e.g., a 3D model of the item) based on a set of images of an item and based on a product model (e.g., a 3D model of a product of which the item is a specimen). In other words, the model generation machine may use the set of images to convert a model of a product to a model of an item. The item may be available for purchase from a seller. The model generation machine may access the set of images, as well as a descriptor of the item. As used herein, a "descriptor" of an item refers to textual information (e.g., one or more alphanumeric characters) that describes the item. A descriptor of an item may include one or more textual tokens (e.g., one or more words, phrases, strings, or numbers). Based on the descriptor of the item, the model generation machine may identify the product model. Accordingly, the model generation machine may generate the item model from the identified product model and the accessed set of images.

In some example embodiments, the model generation machine receives a 3D model of the product from a manufacturer of the product and stores the 3D model in a product database for access when identifying the product model. Similarly, the model generation machine may receive a descriptor of the product from the manufacturer of the product and store the descriptor of the product in the product database for access when identifying the product model.

The descriptor of the product corresponds to the descriptor of the item and may be stored in the product database as corresponding to the descriptor of the item. For example, the product database may store a descriptor of the product with a reference (e.g., a pointer or an address) to the descriptor of the item.

The descriptor of the item may include some or all of the descriptor of the product. Moreover, the descriptor of the item may include an abbreviation, a variation, a nickname, a misspelling, or any suitable combination thereof, of the descriptor of the product. In some example embodiments, the descriptor of the item includes a code that specifies the descriptor of the product (e.g., a color number, a marketing code, or an inventory number). As further examples, the descriptor of the item may include a manufacturer name (e.g., of the product), a model name (e.g., of the product), a model year (e.g., of the product), or any suitable combination thereof.

FIG. 1 is a conceptual diagram illustrating generation of an item model 130 based on a set of images 110 of the item and on a product model 120, according to some example embodiments. The set of images 110 may include one or more images, which may be two-dimensional (2D) graphical images of the item. As shown, the set of images 110 includes an image 111 of the item (e.g., a car), where the image 111 is a left side view of the item. Accordingly, the set of images 110 may be a group of photographs of the item taken from various directions relative to the item (e.g., from multiple angles). The set of images 110 is specific to the item, and as shown, the image 111 of the item may depict one or more characteristics (e.g., defects, customizations, or anomalies) that are unique to the item (e.g., dents or scratches on the driver's door of the car).

The product model 120 is a 3D model of the product of which the item is a specimen. In other words, the product may have a 3D shape common to multiple specimens of the product (e.g., common to multiple items), and the product model 120 may include data that is representative of the 3D shape. For example, the product model may include geometric data (e.g., in the form of a set of points in a 3D coordinate space) that define the 3D shape of the product. Such geometric data may be presentable in the form of a set of points, a wireframe model, a polygon model, a texture mapped model, or any suitable combination thereof. As shown, the product model 120 is a 3D model of a car, and the car is being presented as a wireframe model.

The item model 130 is generated from the set of images 110 and the product model 120. Generation of the item model 130 may be performed by one or more components of a model generation machine. As shown, the item model 130 has the 3D shape of the product model 120, as well as characteristics (e.g., dents or scratches) unique to the item, as depicted in the image 111 of the item (e.g., the car). Accordingly, the item model 130 is a 3D model of the item. In other words, the item model 130 is a 3D model of a particular specimen of the product having the 3D shape that is represented in the product model 120.

Figure 2:
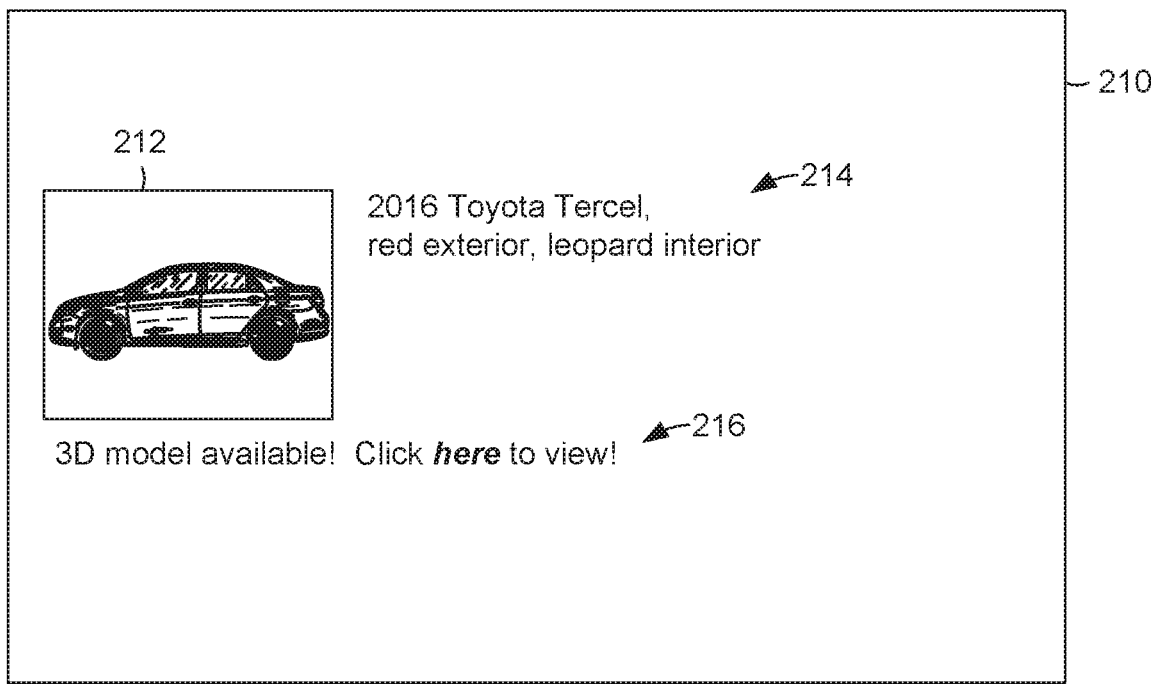
FIG. 2 is a storyboard diagram illustrating a document, with an image of the item, being superseded by a document with a model viewer showing a 3D model of the item, according to some example embodiments.
Figure 2:
Figure 2:
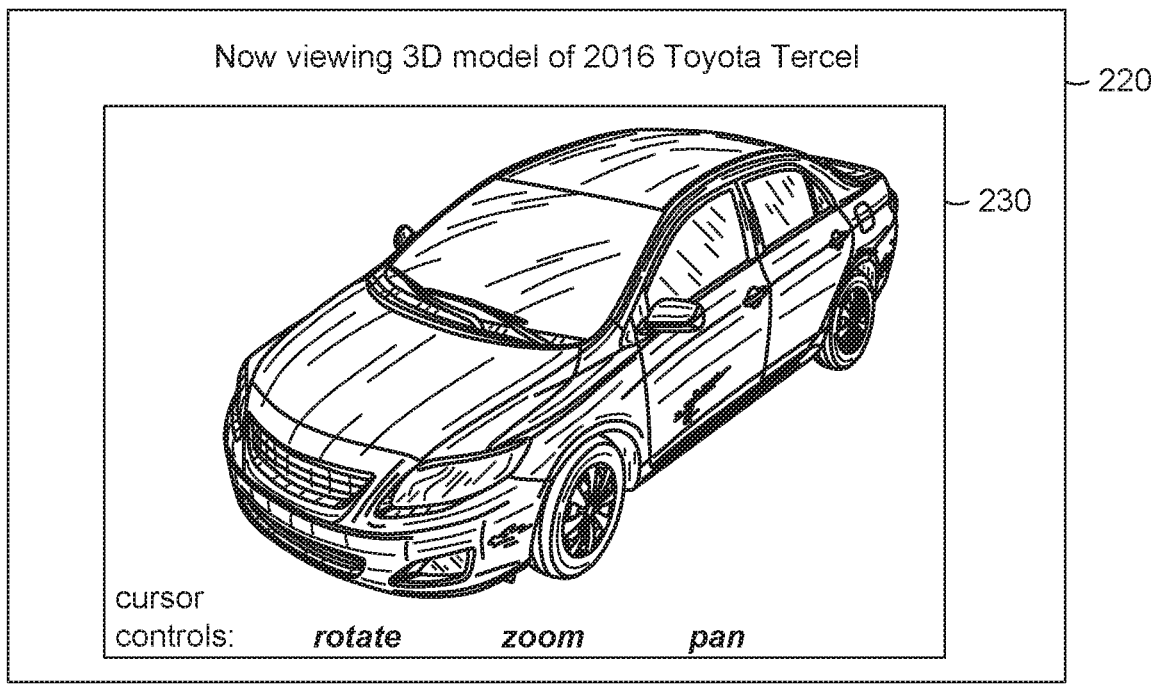

FIG. 2 is a storyboard diagram illustrating a document 210, with an image 212 of the item, being superseded by a document 220 with a model viewer 230 showing a 3D model of the item, according to some example embodiments. In some example embodiments, the documents 210 and 220 may be presented (e.g., sequentially) within a user interface (e.g., a graphical window, a web browser, a document viewer, or a mobile application). For example, one or both of the documents 210 and 220 may constitute all or part of a web page.

As shown, the document 210 is presented first. The document 210 includes the image 212 of the item (e.g., the car), a description 214 of the item, and a control interface 216. The image 212 of the item is a 2D view of the item (e.g., a left side view). The description 214 may include one or more descriptors of the item (e.g., "2016," "Volkswagen," "Beetle," "red," "leopard interior"). The control interface 216 is operable (e.g., by a user) to initiate presentation of the document 220 (e.g., as a replacement for the document 210). Accordingly, the control interface 216 may be a submission control that is operable to submit a request for more information regarding the item (e.g., the car). For example, the request may be a request for the document 220 or for presentation thereof. As shown, the control interface 216 is a hyperlink that may be clicked to present the document 220, and the control interface 216 includes text instructions describing operation of the hyperlink (e.g., "3D model available! Click here to view!").

As indicated by a curved arrow, the document 220 is presented next. The document 220 includes the model viewer 230, which shows a 3D model of the item (e.g., the item model 130). The model viewer 230 may include one or more controls to adjust the presentation of the 3D model of the item. In other words, the model viewer 230 may include all or part of a user interface configured to present the 3D model of the item in any of a number of views. For example, as shown, the model viewer 230 includes three cursor controls, labeled "rotate," "zoom," and "pan." Accordingly, the model viewer 230 may be configured to perform a rotation of the item model 130, a zoom of the item model 130, a pan of the item model 130, or any suitable combination thereof. As shown, the model viewer 230 is present in the document 220 and absent from the document 210.

Figure 3:
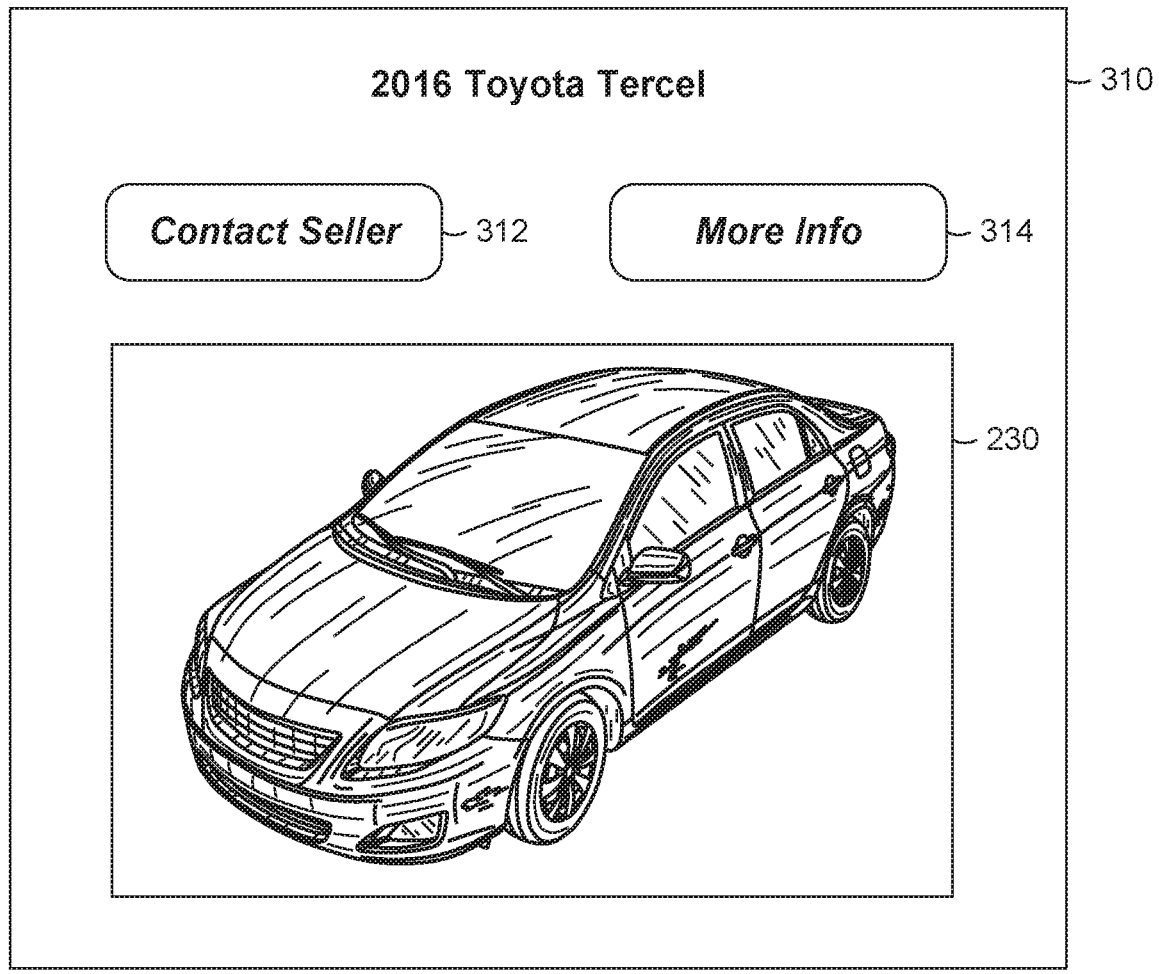
FIG. 3 is a face view of a user interface of a user application with a model viewer showing a 3D model of the item, according some example embodiments.

FIG. 3 is a face view of a user interface 310 of a user application with the model viewer 230 showing a 3D model of the item (e.g., item model 130), according to some example embodiments. The user application may form all or part of user software (e.g., a computer program, a mobile application, an applet, or an app) operable by a user of a model generation machine, a user of a network-based system, or a user of both. The user interface 310 includes a "contact seller" button 312 and a "more info" button 314, in addition to the model viewer 230. In addition, the user interface 310 may include one or more descriptors of the item (e.g., "2016," "Volkswagen," or "Beetle").

The "contact seller" button 312 is operable (e.g., by the user) to initiate a communication with a seller of the item (e.g., a seller of the car). For example, the "contact seller" button 312 may launch an email editor, an instant messaging window, a chat client, a text message interface, or any suitable combination thereof. To some example embodiments, operation of the "contact seller" button 312 initiates a communication that is pre-addressed to the seller (e.g., by mail address, email address, username, identifier, or phone number).

The "more info" button 314 is operable (e.g., by the user) to initiate presentation of further information regarding the item shown in the model viewer 230 (e.g., information that references the item). For example, the "more info" button 314 may be a hyperlink that is operable to present a product information document that provides detailed specifications for the item. As another example, operation of the "more info" button 314 may present a view item page maintained by the seller of the item and providing merchandising information about the item.

As noted above, the model viewer 230 may be configured to present the 3D model of the item in any number of views.

As such, the model viewer 230 may be configured to respond to one or more cursor inputs (e.g., touchscreen inputs) by manipulating the 3D image of the item (e.g., item model 130) within the model viewer 230.

Figure 4:
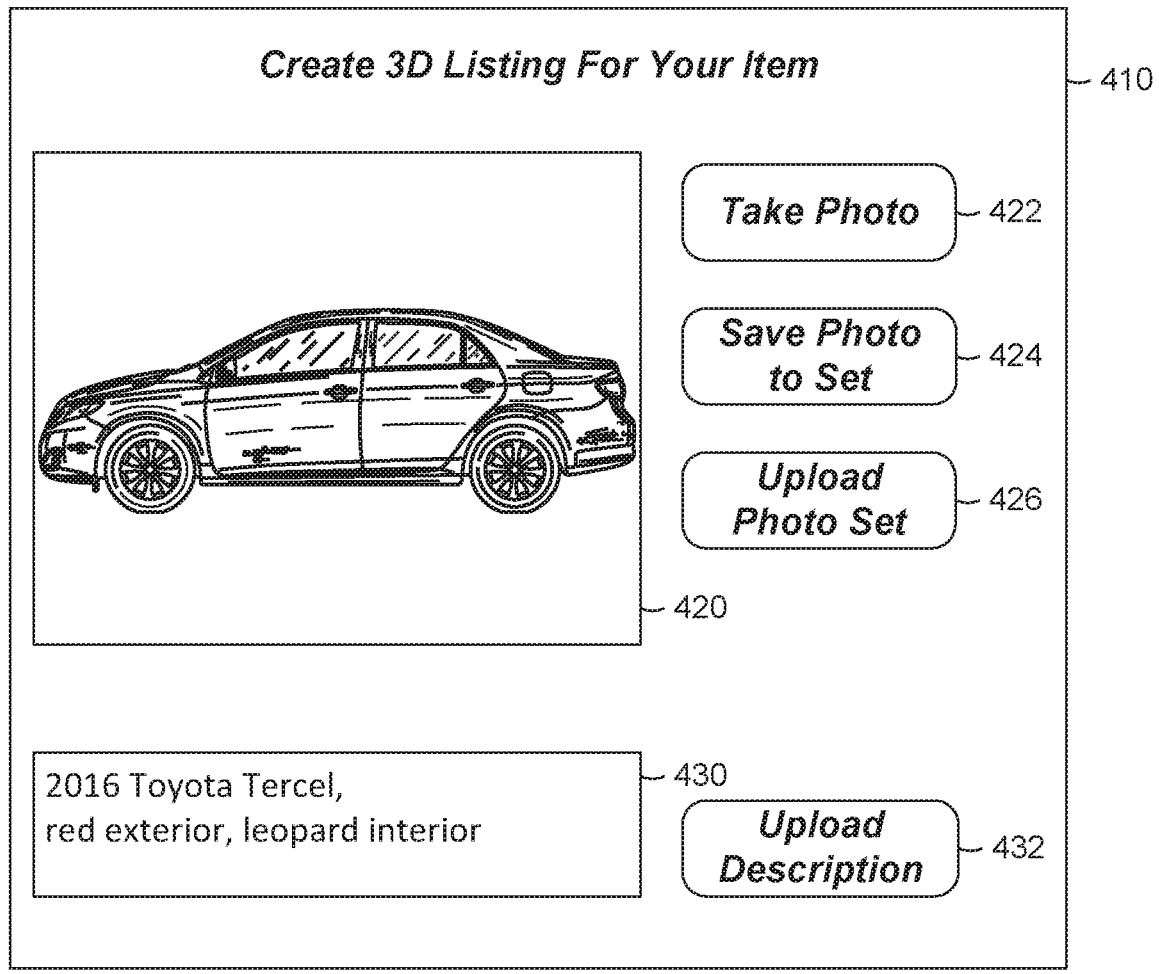
FIG. 4 is a face view of a user interface of a seller application configured to facilitate generation of an item model based on a descriptor and images, according to some example embodiments.

FIG. 4 is a face view of a user interface 410 of a seller application configured to facilitate generation of the item model 130 based on a descriptor and the set of images 110, according to some example embodiments. The seller application may form all or part of the seller software (e.g., a computer program, a mobile application, an applet, or app) operable by a seller of an item in using a seller device (e.g., a camera-enabled mobile phone) to communicate with a model generation machine, with a network-based system, or with both. The user interface 410 includes an image viewer 420, a "take photo" button 422, a "save photo to set" button 424, an "upload photo set" button 426, a description entry field 430, and an "upload description" button 432. The seller application may be executable by a seller device that includes a camera, and the seller application may be configured to generate the set of images 110 using the camera of the seller device.

The image viewer 420 displays an image of the item (e.g., image 111) as captured by the seller device (e.g., by a camera within or connected to the seller device). The image of the item may be stored temporarily or indefinitely on the seller device (e.g., in a memory card, a cache, or a flash drive). Accordingly, the image viewer 420 may display a saved image or an unsaved image. As shown, the image viewer 420 displays a live image from a camera of the seller device.

The "take photo" button 422 is operable (e.g., by the seller) to save the image shown in the image viewer 420 on the seller device. This may have the effect of mimicking the operation of a camera shutter in taking a photograph. Consequently, one or more activations of the "take photo" button 422 may generate one or more images included in the set of images 110 of the item.

The "save photo to set" button 424 is operable (e.g., by the seller) to save the image displayed in the image viewer 420 to a set of images (e.g., save the image 111 to the set of images 110). In some example embodiments, the set of images is stored by the seller device (e.g., a persistent storage location), and operation of the "save photo to set" button 424 initiates storage of the displayed image (e.g., image 111) to be stored among the set of images (e.g., set of images 110).

The "upload photo set" button 426 is operable (e.g., by the seller) to enable access to the set of images (e.g., set of images 110) by a model generation machine, by a network-based system, or by any suitable combination thereof. Enabling access to the set of images may include transmitting the set of images (e.g., to the model generation machine) or transmitting an authorization to access the set of images. For example, the model generation machine may access (e.g., read) the set of images 110 in response to reception of an authorization to access the set of images 110, where the authorization was initiated by activation of the "upload photo set" button 426. As another example, the model generation machine may access (e.g., receive) the set of images 110 in response to a transmission of the set of images 110, where the transmission was initiated by activation of the "upload photo set" button 426.

The description entry field 430 is operable (e.g., by the seller) to enter one or more descriptors pertinent to the item depicted in the set of items (e.g., set of images 110), including the image displayed in the image viewer 420 (e.g., image 111). The description entry field 430 may accept text in the form of alphanumeric characters, including numbers, letters, words, phrases, codes, or any suitable combination thereof. As shown, the description entry field includes multiple descriptors (e.g., "2016," "Volkswagen," "Beetle," "red exterior," and "leopard").

The "upload description" button 432 is operable (e.g., by the seller) to enable access to the one or more descriptors by a model generation machine, by a network-based system, or by any suitable combination thereof. Enabling access to the one or more descriptors may include transmitting the one or more descriptors (e.g., to the model generation machine) or transmitting an authorization to access the one or more descriptors. As an example, the model generation machine may access (e.g., read) the one or more descriptors in response to reception of an authorization to access the one or more descriptors, where the authorization was initiated by activation of the "upload descriptor" button 432. As another example, the model generation machine may access (e.g., receive) the one or more descriptors in response to a transmission of the one or more descriptors, where the transmission was initiated by activation of the "upload description" button 432.

Figure 5:
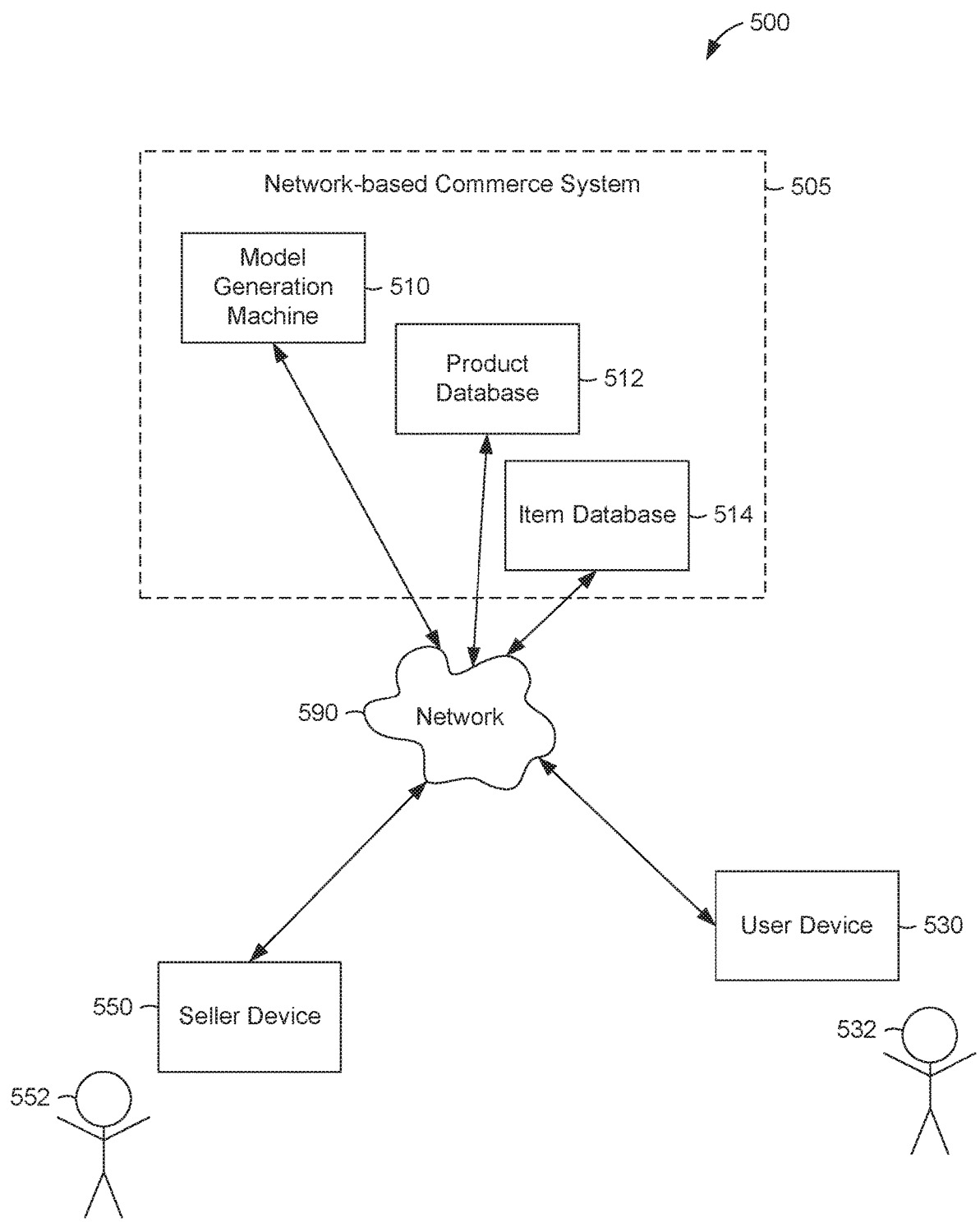
FIG. 5 is a network diagram illustrating a network environment suitable for generating an item model based on descriptor and images, according to some example embodiments.

FIG. 5 is a network diagram illustrating a network environment 500 suitable for generating the item model 130 based on a descriptor (e.g., "2016 Volkswagen Beetle") and the set of images 110, according to some example embodiments. The network environment 500 includes a model generation machine 510, a product database 512, an item database 514, a user device 530, and the seller device 550, all communicatively coupled to each other via a network 590. As shown, the model generation machine 510, the product database 512, and the item database 514 may form all or part of a network-based commerce system 505. The model generation machine 510 may be implemented in a computer system, as described below with respect to FIG. 11.

Also shown in FIG. 5 are a user 532 and a seller 552. One or both of the user 532 and the seller 552 may be a human user (e.g., a human being), a machine user (e.g., software program configured to interact with the user device 530), or any suitable combination thereof (e.g., a human assisted by a machine). The user 532 is not part of the network environment 500, but is associated with the user device 530 and may be a user of the user device 530. For example, the user device 530 may be a deskside computer, a tablet computer, or a smart phone belonging to the user 532. Similarly, the seller 552 is not part of the network environment 500, but is associated with the seller device 550. As an example, the seller device 550 may be a tablet computer belonging to the seller 552. According to various example embodiments, the seller device 550 includes a camera or is otherwise capable of generating one or more images (e.g., image 111) of the item.

Any of the machines, databases, or devices shown in FIG. 5 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 11. As used herein, a "database" is a data storage resource and may store data structured as a text file, a table, a spreadsheet, a relational database, a triple store, or any suitable combination thereof. Moreover, any two or more of the machines illustrated in FIG. 5 may be combined into a single machine, and the functions described herein for any single machine may be subdivided among multiple machines.

The network 590 may be any network that enables communication between machines (e.g., model generation machine 510). Accordingly, the network 590 may be a wired network, a wireless network, or any suitable combination thereof. The network 590 may include one or more portions that constitute a private network, a public network (e.g., the Internet), or any suitable combination thereof.

Figure 6:
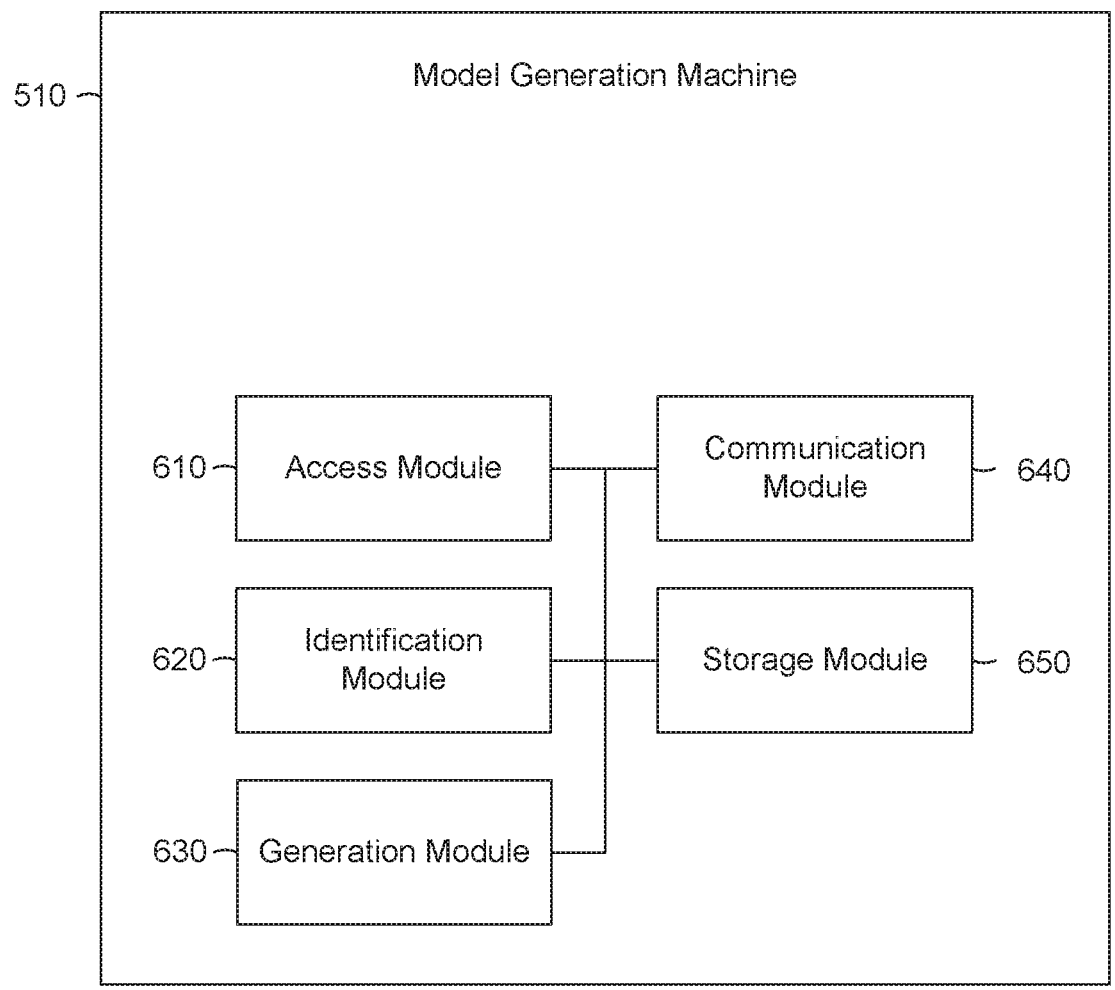
FIG. 6 is a block diagram illustrating components of a model generation machine, according to some example embodiments.

FIG. 6 is a block diagram illustrating components of a model generation machine 510, according to some example embodiments. The model generation machine 510 includes an access module 610, an identification module 620, a generation module 630, a communication module 640, and a storage module 650, all configured to communicate with each other (e.g., via a bus, a shared memory, or a switch). Any one or more of these modules may be implemented using hardware (e.g., a processor of a machine) or a combination of hardware and software. Moreover, any two or more of these modules may be combined into a single module, and the functions described herein for a single module may be subdivided among multiple modules.

The access module 610 is configured to access the set of images 110 and a descriptor (e.g., "Volkswagen Beetle") of an item. The set of images 110 and the descriptor may be provided from the seller device 550. The access module 610 may access the set of images 110, the descriptor, or both, by accessing the item database 514, the seller device 550, or any suitable combination thereof.

The identification module 620 is configured to identify the product model 120 based on the descriptor of the item. As noted above, product model 120 is an example of a 3D model of the product of which the item is a specimen. The identification module 620, and identifying the product model 120, may access the product database 512 to access the product model 120, a descriptor (e.g., "Beetle") of the product, or any suitable combination thereof.

The generation module 630 is configured to generate the item model 130 based on the product model 120 and based on the set of images 110. As noted above, the item model 130 is an example of a 3D model of the item, which may be available for purchase from the seller 552.

The generation module 630 may be configured to perform edge detection, image segmentation, background removal, or any suitable combination thereof, upon one or more images (e.g., image 111) from the set of images 110. For example, the generation module 630 may detect an edge of the item depicted in the image 111. As another example, the generation module 630 may segment the image 111 into a foreground portion and a background portion, where the foreground portion depicts the item (e.g., the car) and the item is absent from the background portion. As a further example, the generation module 630 may remove the background portion of the image from the image (e.g., after segmentation of the image). In one or more of these examples, the generation module 630 may utilize known techniques for segmentation of images.

In some example embodiments, the generation module 630, in generating the item model 130, identifies an unusable image within the set of images 110 and removes the unusable image from the set of images 110. For example, after one or more of a detection, image segmentation, or background removal, the generation module 630 may determine that an image depicts an incorrect item (e.g., different from the item depicted in the remainder of the set of images 110), a prohibited item (e.g., an item unsupported by the network-based commerce system 505), or no item at all. As another example, the generation module 630 may determine that an image is unsuitable for use in generating the item model 130 due to, for instance, insufficient resolution, low brightness, poor contrast, lack of clarity (e.g., blur), or any suitable combination thereof. As a further example, the generation module 630 may determine that an image includes prohibited content (e.g., vulgar or obscene text or graphics). Accordingly, the generation module may identify such an image as an unusable image.

In certain example embodiments, the generation module 630, in generating the item model 130, identifies a portion of a product model 120 that is to be texture mapped with an image (e.g., image 111) from the set of images 110. Similarly, in generating the item model 130, the generation module 630 may identify multiple images (e.g., two or more images) from the set of images 110 that intersect in an overlapping region of the product model 120, when the multiple images are texture mapped onto the product model 120. The identification of the portion, the multiple images, or any combination thereof, may be based on an analysis (e.g., comparison) of the foreground of the image with the product model 120.

In various example embodiments, the generation module 630 texture maps at least some of the set of images 110 onto the product model 120, in generating the item model 130. Accordingly, the generation module 630 may include a texture mapping engine. In alternative example embodiments, the texture mapping is performed by a separate texture mapping engine (e.g., within a graphics processor) within the model generation machine or within the user device 530.

Furthermore, according to some example embodiments, the generation module 630 is configured to generate the model viewer 230 (e.g., for inclusion in the document 220 or in the user interface 310). As noted above, the model viewer 230 may be configured to perform a rotation, a zoom, or a pan, or any suitable combination thereof, of the item model 130.

The communication module 640 is configured to receive the product model 120 (e.g., from a manufacturer of the product of which the item is a specimen), receive a descriptor (e.g., "Beetle") of the product (e.g., from the manufacturer of the product), or any suitable combination thereof. According to certain example embodiments, the communication module 640 provides a user application to the user device 530. The user application may include the user interface 310, which includes the model viewer 230 and is configured to present the model viewer 230 on the user device 530 (e.g., to the user 532).

In some example embodiments, the communication module 640 provides the document 210 to the user device 530. As noted above, the model viewer 230 is absent from the document 210, though the document 210 includes a descriptor (e.g., "Volkswagen Beetle") of the item, as well as the control interface 216 (e.g., a submission control). Operation of the control interface 216 may cause the communication module 640 to receive a request for the document 220 from the user device 530. In response to the receiving of this request, the communication module 640 may provide the document 220 to the user device 530. As noted above, the document 220 includes the model viewer 230.

In certain example embodiments, the communication module 640 receives the set of images 110 and the descriptor (e.g., "Volkswagen Beetle") of the item (e.g., from the seller device 550). For example, the communication module 640 may receive the set of images 110 as a result of operation of the "upload photo set" button 426, and the communication module 640 may receive the descriptor of the item as a result of operation of the "upload description" button 432. In other words, the description of the item and the set of images 110 may be received by the communication module 640 as a submission by the seller 552 of the item.

In various example embodiments, the communication module 640 provides a seller application to the seller device 550. The seller application may include the user interface 410, which may be configured to communicate the set of images 110, the descriptor (e.g., "Volkswagen Beetle") of the item, or both, to the model generation machine 510, the network-based commerce system 505, or any suitable combination thereof.

The storage module 650 is configured to store the product model 120, the descriptor (e.g., "Beetle") of the product, or both, in the product database 512 (e.g., for access by the identification module 620). In some example embodiments, a storage module stores the item model 130 in the item database 514 (e.g., for access by the model generation machine 510, the network-based commerce system 505, the user device 530, the seller device 550, or any suitable combination thereof). The storage module 650 may also store one or more images (e.g., image 111) of the set of images 110 in the item database 514, as corresponding to the item (e.g., as examples of information that references the item), for access by the access module 610. Similarly, the storage module 650 may store a descriptor (e.g., one or more descriptors uploaded by the seller 552 using the description entry field 430 of the user interface 410) in the item database 514, as corresponding to the item, for access by the access module 610.

Figure 7:
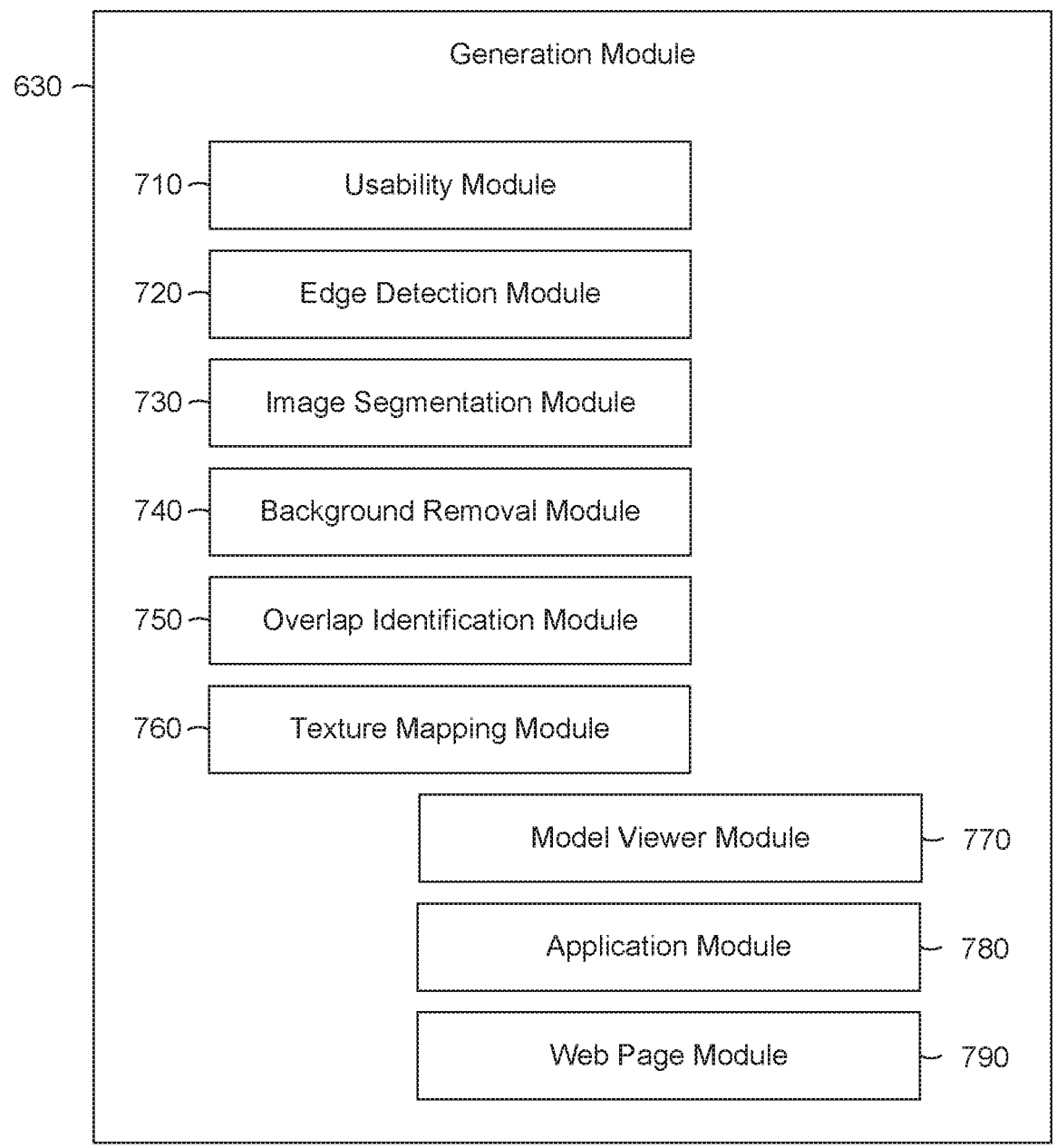
FIG. 7 is a block diagram illustrating components of a generation module within a model generation machine, according to some example embodiments.

FIG. 7 is a block diagram illustrating modules 710-790 within the generation module 630 of the model generation machine 510, according to some example embodiments. As shown, the generation module 630 includes a usability module 710, and edge detection module 720, an image segmentation module 730, a background removal module 740, an overlap identification module 750, a texture mapping module 760, a model viewer module 770, the application module 780, and a web page module 790, all configured to communicate with each other within the generation module 630. The modules 710-790 may each implement one or more of the functionality as described above with respect to the generation module 630.

For example, the usability module 710 may be configured to identify an unusable image within a set of images 110, remove the unusable image from the set of images 110, or both. As noted above, identification of the unusable image may include determining that an image (e.g., image 111) depicts an incorrect item, a prohibited item, or no item at all. This identification may include determining that the image is of poor quality (e.g., has insufficient resolution, low brightness, contrast, or blur) or that the image includes prohibited content.

The edge detection module 720 may detect an edge of the item (e.g., the car) depicted in one or more images (e.g., image 111) within the set of images 110. The image segmentation module 730 may be configured to segment an image into a foreground portion and a background portion, and the background removal module 740 may be configured to remove the background portion of the image.

The overlap identification module 750 identifies two or more images (e.g., image 111) that overlap each other when texture mapped onto the product model 120, thus intersecting in an overlapping region of the product model 120. A texture mapping module 760 is configured to perform texture mapping of some or all of the set of images 110 onto the product model 120.

The model viewer module 770 is configured to generate the model viewer 230. In some example embodiments, generation of the model viewer 230 includes generating a widget or pop up window configured to present (e.g., display, manipulate, or both) the item model 130.

The application module 780 is configured to generate a user application (e.g., for provision by the communication module 640 to the user device 530). Accordingly, the application module 780 may generate the user interface 310.

The web page module 790 is configured to generate the document 210, the document 220, or both (e.g., for provision by the communication module 640 to the seller device 550). As noted above, one or both of the documents 210 and 220 may be generated as web pages.

Figure 8:
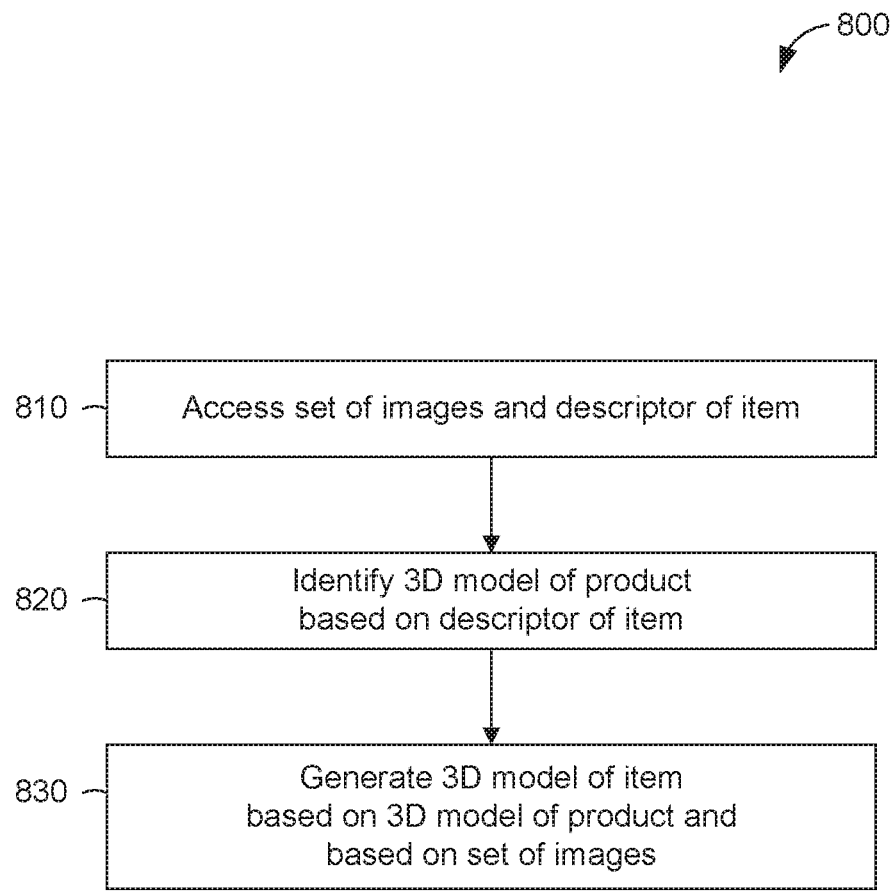
FIGS. 8-10 are flowcharts illustrating operations in a method of generating an item model based on a descriptor and images, according to some example embodiments.
Figure 9:
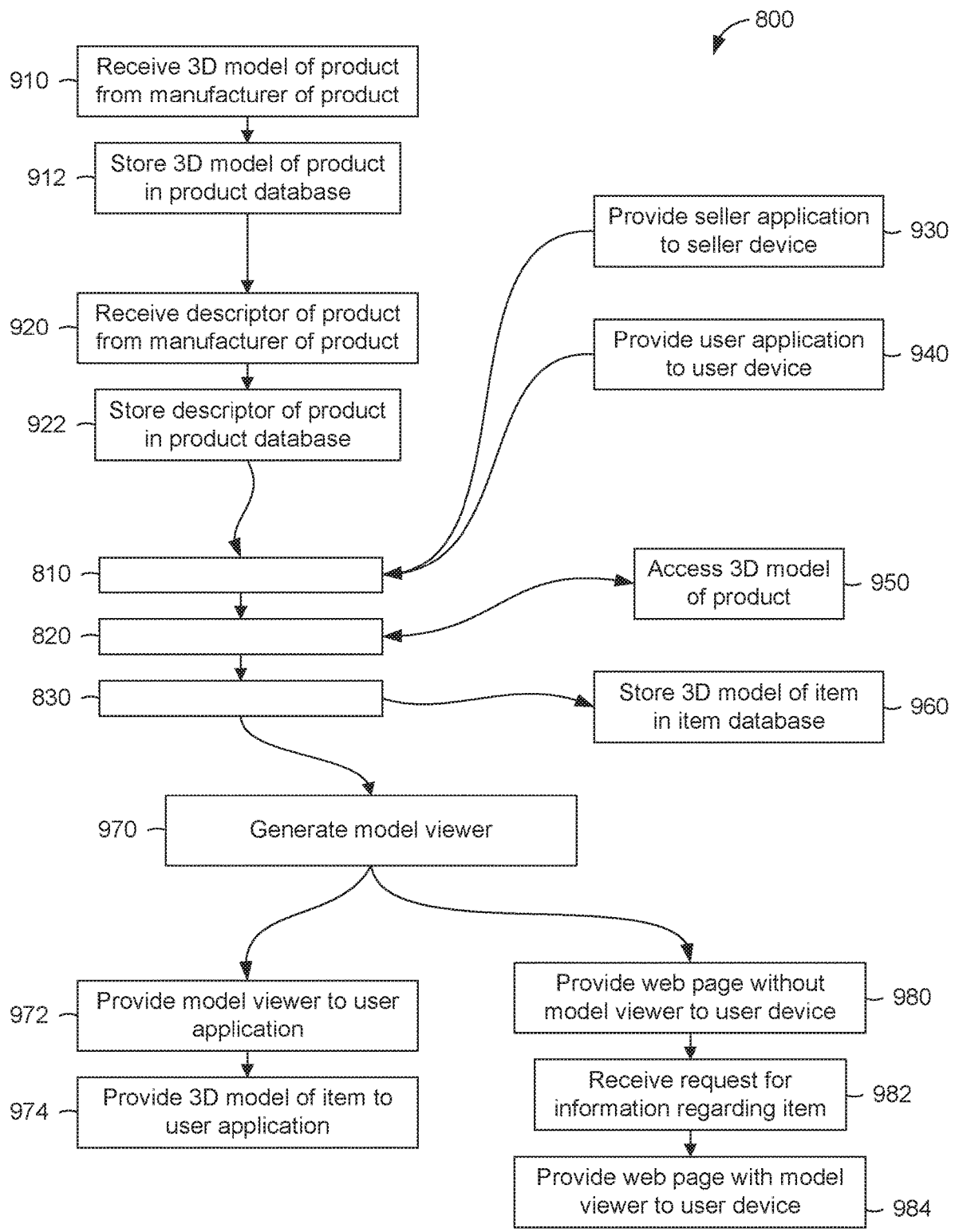
Figure 10:
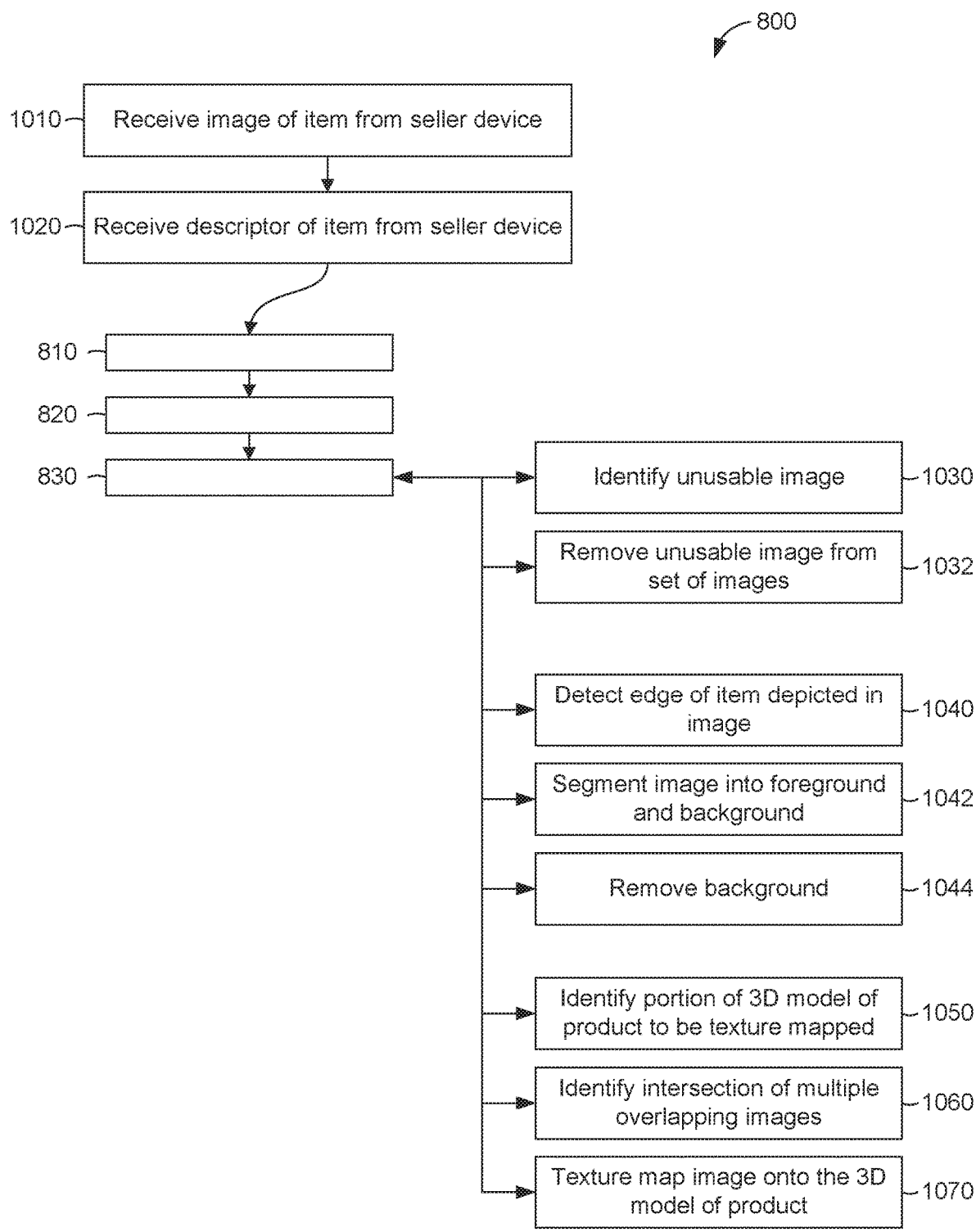

FIGS. 8-10 are flowcharts illustrating operations in a method 800 of generating the item model 130 based on a descriptor (e.g., "Volkswagen Beetle") and the set of images 110, according to some example embodiments. Operations of the method 800 may be performed by the model generation machine 510, using modules described above with respect to FIGS. 6-7.

As shown in FIG. 8, some example embodiments of the method 800 include operations 810, 820, and 830. In operation 810, the access module 610 of the model generation machine 510 accesses the set of images 110 and a descriptor (e.g., "Volkswagen Beetle") of the item depicted in the set of images 110. For example, the access module 610 may access the set of images 110, the descriptor, or both, by accessing the item database 514, the seller device 550, or any suitable combination thereof.

In operation 820, the identification module 620 of the model generation machine 510 identifies the product model 120 based on the descriptor of the item. For example, the identification module 620 may access the descriptor of the item (e.g., stored in the item database 514), access a descriptor of the product (e.g., stored in the product database 512), and perform a comparison of the two descriptors. Based on the comparison, the identification module 620 may determine that the item is a specimen of the product and identify the product model 120 as corresponding to the item.

In operation 830, the generation module 630 of the model generation machine 510 generates the item model 130 based on the product model 120 (e.g., as identified in operation 820) and based on the set of images 110 (e.g., as accessed in operation 810). Further details of operation 830, according to some example embodiments, are discussed below with respect to FIG. 10.

As shown in FIG. 9, some example embodiments of the method 800 include one or more of operations 910-984. In operation 910, the communication module 640 of the model generation machine 510 receives the product model 120 from a manufacturer of the product (e.g., from a server machine maintained by the manufacturer). In operation 912, the storage module 650 of the model generation machine 510 stores the product model 120 in the product database 512 (e.g., for access in operation 810).

Similarly, in operation 920, the communication module 640 of the model generation machine 510 receives a descriptor of the product from the manufacturer of the product. Likewise, in operation 922, the storage module 650 of the model generation machine 510 stores the descriptor of the product in the product database 512 (e.g., for access in operation 820).

Operation 930 may be executed at any point prior to performance of operation 810. In operation 930, the communication module 640 of the model generation machine 510 provides a seller application to the seller device 550.

The seller application may be generated by the application module 780 of the model generation machine 510 prior to performance of operation 930. As noted above, the seller application may be configured to communicate the set of images 110, the descriptor of the item, or both, from the seller device 550 to the network-based commerce system 505 (e.g., to the model generation machine 510).

In a similar fashion, operation 940 may be executed at any point prior to performance of operation 810. In operation 940, the communication module 640 provides a user application to the user device 530. The user application may be generated by the application module 780 prior to performance of operation 940. As noted above, the user application may be configured to present the model viewer 230 on the user device 530.

Operation 950 may be performed as part of operation 820, performed in parallel (e.g., contemporaneously) with operation 820, performed in response to operation 820, or any suitable combination thereof. In operation 950, the access module 610 of the model generation machine 510 accesses the product model 120 (e.g., by accessing the product database 512). Accordingly, the access module 610 may provide the product model 120 to the generation module 630 (e.g., for use in operation 830).

In operation 960, the storage module 650 of the model generation machine 510 stores the item model 130 in the item database 514. This may have the effect of preserving the item model 130 for use in generating the model viewer 230, as described immediately below with respect to operation 970.

In operation 970, the generation module 630 of the model generation machine 510 generates the model viewer 230. The model viewer 230 may be generated as a generic model viewer without the item model 130 or generated as a specific model viewer based on (e.g., including) the item model 130. Accordingly, generation of the model viewer 230 may include accessing the item model 130 (e.g, by accessing the item database 514).

In operation 972, the communication module 640 of the model generation machine 510 provides the model viewer 230 to the user device 530 (e.g., to a user application executing on the user device 530). For example, the user application may display the user interface 310 on the user device 530, and the codification module 640 may provide the model viewer 230 for inclusion in the user interface 310. In operation 974, the communication module 640 provides the item model 132 the user device 530 (e.g., to the user application executing on the user device 530). Some example embodiments, the model viewer 230 includes the item model 130, and these operations 972 and 974 may be performed as a single operation.

In operation 980, the communication module 640 of the model generation machine 510 provides the document 210 (e.g., a web page without the model viewer 230) to the user device 530 (e.g., to a browser executing on the user device 530). As noted above, the document 210 may include a control interface 216 that is operable to submit a request for information regarding the item. Supposing that the control interface 216 is operated, in operation 982, the communication module 640 receives the request for information regarding the item (e.g., as communicated from the user device 530). In operation 984, the communication module 640 provides the document 220 (e.g., a web page with the model viewer 230) to the user device 530. In example embodiments where the item model 130 is included in the model viewer 230, the item model 130 is accordingly provided along with the model viewer 230. An alternative example embodiments where the item model 130 is not included in the model viewer 230, a further operation may be performed by the communication module 640 to provide the item model 132 the user device 530 for inclusion in the model viewer 230.

As shown in FIG. 10, some example embodiments of the method 800 include one or more of operations 1010-1070. In operation 1010, the communication module 640 of the model generation machine 510 receives one or more images (e.g., image 111) from the seller device 550. The one or more images may constitute all or part of the set of images 110. For example, operation 1010 may be performed in response to operation of the "upload photo set" button 426 in the user interface 410 of a seller application executing on the seller device 550. In a further operation, the storage module 650 of the model generation machine 510 may store the one or more images in the item database 514 (e.g., for access in operation 810).

Similarly, in operation 1020, the communication module 640 receives one or more descriptors of the item from the seller device 550. The one or more descriptors may constitute all or part of a description of the item. For example, operation 1020 may be performed in response to operation of the "upload description" button 432 in the user interface 410 of the seller application executing on the seller device 550. In a further operation, the storage module 650 of the model generation machine 510 may store the one or more descriptors in the item database 514 (e.g., for access in operation 810).

One or more of operations 1030-1070 may be included in operation 830, which may be performed by the generation module 630 of the model generation machine 510, as noted above. According to various example embodiments, one or more of the modules described above with respect to FIG. 7 are used to perform one or more of operations 1030-1070.

In operation 1030, the usability module 710 identifies an unusable image (e.g., image 111) among the set of images 110. In response to identification of the unusable image, in operation 1032, the usability module 710 may remove the unusable image from the set of images 110.

In operation 1040, the edge detection module 720 detects at least one edge within an image (e.g., image 111) among the set of images 110. For example, the edge detection module 720 may detect an edge of the item as depicted in the image. In operation 1042, the image segmentation module 730 segments the image (e.g., image 111) into a foreground portion and the background portion. As noted above, the foreground portion may depict the item, and the item may be absent from the background portion. In operation 1044, the background removal module 740 removes the background portion of the image (e.g., image 111) from the image (e.g., leaving only the foreground portion within the image).

In operation 1050, the texture mapping module 760 identifies a portion of the product model 120 to be texture mapped with an image (e.g., image 111) from the set of images 110. In operation 1060, the overlap identification module 750 identifies two or more images (e.g., image 111) from the set of images 100 and that intersect in an overlapping region of the product model 120 when texture mapped onto the product model 120. In operation 1070, the texture mapping module 760 texture maps at least some of the set of images 110 onto the product model 120. In some example embodiments, the texture mapping module 760 performs the texture mapping based on (e.g., taking into account) the overlapping region identified in operation 1060.

According to various example embodiments, one or more of the methodologies described herein may facilitate communication of information about an item available for purchase from a seller. In particular, one or more the methodologies described herein may constitute all or part of a business method (e.g., a business method implemented using a machine) that provides a seller with an efficient and convenient way to create a 3D model of the item, that provides a user with an efficient and convenient way to receive 3D information about the item, or any suitable combination thereof. Accordingly, one or more the methodologies described herein may have the effect of facilitating a purchase of the item, increasing sales of the product of which the item is a specimen, increasing user attention (e.g., as measured in page views or clickthroughs) on the product, or any suitable combination thereof.

When these effects are considered in aggregate, one or more of the methodologies described herein may obviate a need for certain efforts or resources that otherwise would be involved in matching users (e.g., as potential purchasers) with products or specimens thereof that are likely to be of interest. Efforts expended by a user in identifying a product for purchase may be reduced by one or more of the methodologies described herein. Computing resources used by one or more machines, databases, or devices (e.g., within the network environment 500) may similarly be reduced. Examples of such computing resources include processor cycles, network traffic, memory usage, data storage capacity, power consumption, and cooling capacity.

Figure 11:
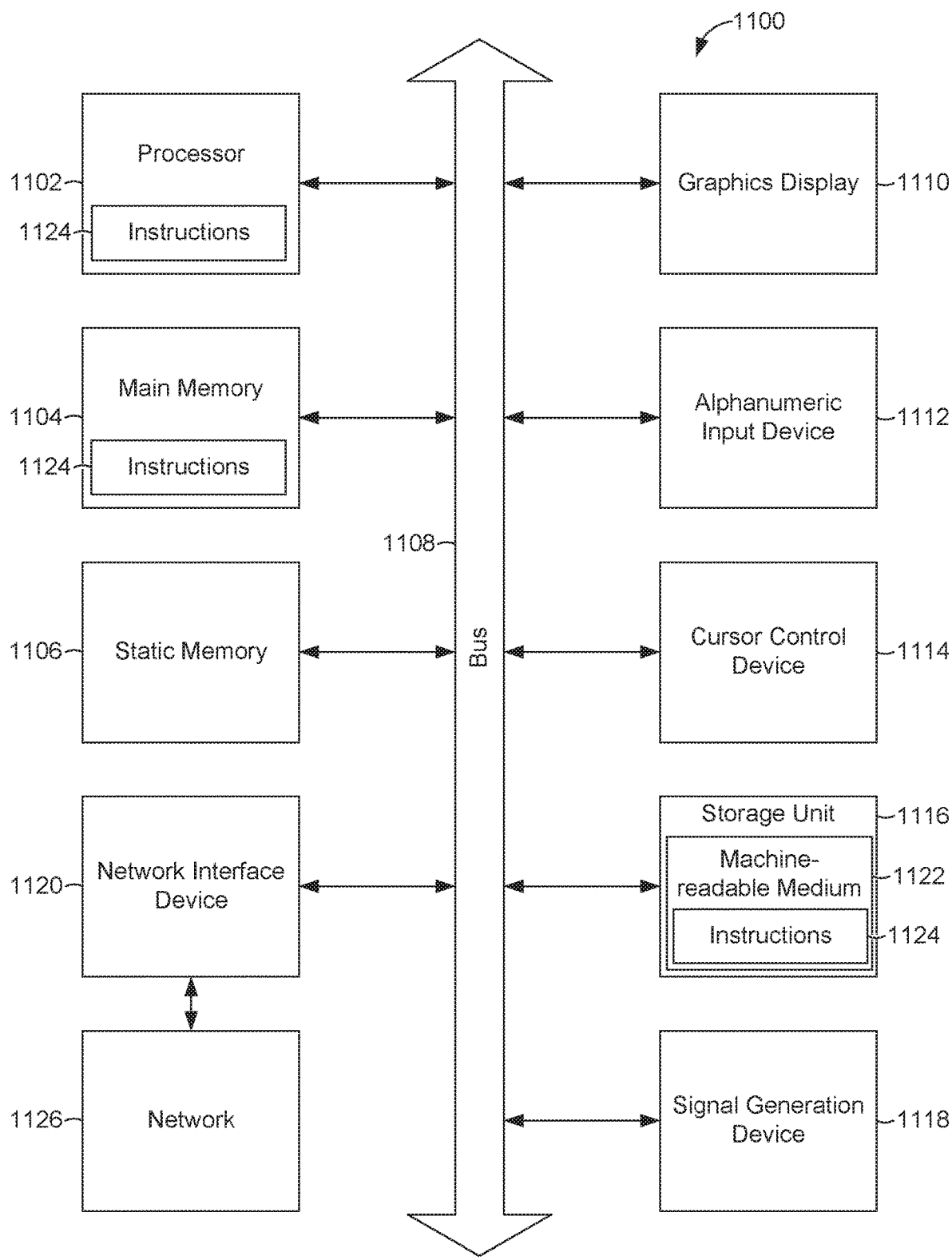
FIG. 11 is a block diagram illustrating components of a machine, according to some example embodiments, able to read instructions from a machine-readable medium and perform any one or more of the methodologies discussed herein.

FIG. 11 illustrates components of a machine 1100, according to some example embodiments, that is able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system and within which instructions 1124 (e.g., software) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124 (sequentially or otherwise) that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 (e.g., network 590) via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., software) for execution by the machine, such that the instructions, when executed by one or more processors of the machine (e.g., processor 1102), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   hardware processing circuitry;
   a hardware memory storing instructions that when executed configure the hardware processing circuitry to perform operations comprising:
   accessing an item descriptor and a set of images that depict an item, the item being a specimen of a product having a three-dimensional (3D) shape, an image among the set of images depicting a characteristic that is present in the item yet absent from the product of which the item is the specimen;

generating, via the hardware processing circuitry, a 3D model of the item based on a 3D model of the product and based on the image that depicts the characteristic, a 3D shape of the 3D model of the item matching the 3D shape of the product; and causing display of the generated 3D model.

2. The system of claim 1, wherein the 3D model of the product includes geometric data that represents the 3D shape.

3. The system of claim 2, wherein the generated 3D model of the item has the 3D shape of the product and depicts the characteristic that is present in the item yet absent from the 3D model of the product.

4. The system of claim 1, the operations further comprising receiving a product descriptor that describes the product, the product descriptor matching the item descriptor, wherein the 3D model of the product is identified based on the product descriptor matching the item descriptor.

5. The system of claim 1, wherein the generating of the 3D model of the item includes:

detecting an edge of the item depicted in the image among the set of images;

segmenting the image into a plurality of portions that include a foreground portion and a background portion, the segmenting being based on the detected edge of the item; and removing the background portion from the image.

6. The system of claim 5, wherein the foreground portion depicts the item, and the item is absent from the background portion.

7. The system of claim 1, wherein the generating of the 3D model of the item includes identifying an unusable image within the set of images.

8. The system of claim 7, wherein identifying the unusable image is based on a criterion selected from a group consisting of insufficient resolution, low brightness, poor contrast, and lack of clarity.

9. The system of claim 7, wherein identifying the unusable image includes determining that the unusable image depicts prohibited content.

10. The system of claim 1, wherein: the set of images is a first set of images within a second set of images; and the operations further comprise identifying an unusable image among the second set of images yet absent from the first set of images, the identifying of the unusable image including determining that the unusable image does not depict the item.

11. The system of claim 1, wherein the generating of the 3D model of the item includes:

identifying a portion of the 3D model of the product; and mapping the identified portion of the 3D model of the product to the image.

12. The system of claim 11, wherein the generating of the 3D model of the item includes at least partially overlapping a further image among the set of images on the identified portion of the 3D model of the product.

13. The system of claim 1, the operations further comprising performing one or more of a rotation of the 3D model of the item, a zoom of the 3D model of the item, and a pan of the 3D model of the item.

14. The system of claim 1, wherein causing display of the generated 3D model of the item comprises displaying a web page on a device in response to a request from the device to view the generated 3D model of the item.

15. The system of claim 14, the operations further comprising:

receiving a second request from the device, the second request being for information corresponding to the item being the specimen of the product having the 3D shape; and providing the web page to the device in response to the receiving of the second request.

16. The system of claim 15, the operations further comprising providing a seller application to a second device, the seller application being configured to communicate the item descriptor and the set of images that includes the image depicting the characteristic that is present in the item yet absent from the product, the item descriptor and the set of images being communicable from the second device.

17. A method, comprising:

accessing an item descriptor and a set of images that depict an item, the item being a specimen of a product having a three-dimensional (3D) shape, an image among the set of images depicting a characteristic that is present in the item yet absent from the product of which the item is the specimen;

generating, via processing circuitry, a 3D model of the item based on a 3D model of the product and based on the image that depicts the characteristic, a 3D shape of the 3D model of the item matching the 3D shape of the product; and causing display of the generated 3D model.

18. The method of claim 17, wherein the generating of the 3D model of the item includes:

detecting an edge of the item depicted in the image among the set of images;

segmenting the image into a plurality of portions that include a foreground portion and a background portion, the segmenting being based on the detected edge of the item; and removing the background portion from the image.

19. A non-transitory computer readable storage medium comprising instructions that when executed configured hardware processing circuitry to perform operations comprising:

accessing an item descriptor and a set of images that depict an item, the item being a specimen of a product having a three-dimensional (3D) shape, an image among the set of images depicting a characteristic that is present in the item yet absent from the product of which the item is the specimen;

generating, via the hardware processing circuitry, a 3D model of the item based on a 3D model of the product and based on the image that depicts the characteristic, a 3D shape of the 3D model of the item matching the 3D shape of the product; and causing display of the generated 3D model.

20. The non-transitory computer readable storage medium of claim 19, the operations further comprising providing a seller application to a device, the seller application being configured to communicate the item descriptor and the set of images that includes the image depicting the characteristic that is present in the item yet absent from the product, the item descriptor and the set of images being communicable from the device.

* * * * *

UNITED STATES PATENT AND TRADEMARK OFFICE
CERTIFICATE OF CORRECTION

PATENT NO. : 11,004,260 B2
APPLICATION NO. : 16/196615
DATED : May 11, 2021
INVENTOR(S) : Sajeev Pillai Page 1 of 1

It is certified that error appears in the above-identified patent and that said Letters Patent is hereby corrected as shown below:

In the Specification

Column 1, Line 7, delete "2017 ," and insert -- 2017, --, therefor.

Column 1, Lines 12-13, delete "IMAGES," filed on May 31, 2013," and insert -- IMAGES," --, therefor.

Column 1, Line 14, delete "filed on" and insert -- filed --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*